United States Patent
Striegler

(10) Patent No.: US 7,105,232 B2
(45) Date of Patent: Sep. 12, 2006

(54) GLASS CERAMIC OR GLASS COOK TOP WITH AN IR-PERMEABLE UNDERCOAT

(75) Inventor: Harald Striegler, Ockenheim (DE)

(73) Assignee: Schott AG, Mainz (DE)

( * ) Notice: Subject to any disclaimer, the term of this patent is extended or adjusted under 35 U.S.C. 154(b) by 120 days.

(21) Appl. No.: 10/664,120

(22) Filed: Sep. 17, 2003

(65) Prior Publication Data

US 2004/0091718 A1    May 13, 2004

(30) Foreign Application Priority Data

Sep. 19, 2002   (DE) ............................... 102 43 500

(51) Int. Cl.
   *B32B 17/00*   (2006.01)
(52) U.S. Cl. ................. 428/427; 428/426; 428/428
(58) Field of Classification Search ................ 428/426, 428/427, 428, 432; 219/464, 446.1, 506, 219/502, 492, 445.1; 126/39
   See application file for complete search history.

(56) References Cited

U.S. PATENT DOCUMENTS

| | | | |
|---|---|---|---|
| 4,855,550 A * | 8/1989 | Schultz, Jr. ................. 200/600 |
| 5,070,045 A * | 12/1991 | Comte et al. ................... 501/4 |
| 5,484,467 A * | 1/1996 | Nass et al. .................... 65/33.4 |
| 5,948,471 A | 9/1999 | Zimmer |
| 6,043,171 A | 3/2000 | Siebers et al. |
| 6,068,692 A | 5/2000 | Zimmer |
| 6,492,029 B1 * | 12/2002 | Beyrle ........................ 428/428 |
| 6,517,943 B1 * | 2/2003 | Beunet et al. ............... 428/428 |
| 2002/0084263 A1 * | 7/2002 | Wennemann et al. .... 219/460.1 |
| 2003/0012962 A1 | 1/2003 | Beyrle |
| 2003/0019864 A1 | 1/2003 | Krause et al. |
| 2005/0106486 A1 | 5/2005 | Schultheis et al. |

FOREIGN PATENT DOCUMENTS

| | | |
|---|---|---|
| DE | 196 43 870 A1 | 5/1998 |
| DE | 197 21 737 C1 | 11/1998 |
| DE | 198 34 801 A12 | 2/2000 |
| DE | 200 05 461 U1 | 7/2000 |
| DE | 199 06 737 A1 | 9/2000 |
| DE | 200 19 210 U1 | 11/2000 |
| DE | 100 14 373 A1 | 10/2001 |
| DE | 202 00 229 U1 | 5/2002 |
| EP | 0 220 333 A1 | 5/1987 |

(Continued)

OTHER PUBLICATIONS

Heinz G. Pfaender: Schott Guide to Glass, Chapman & Hall, Jan. 15, 1996, pp. 76-77, 120.

*Primary Examiner*—Jennifer C. McNeil
*Assistant Examiner*—Elizabeth D. Ivey
(74) *Attorney, Agent, or Firm*—Michael J. Striker

(57) ABSTRACT

The cook top has a transparent, colorless glass ceramic or glass panel providing a cooking surface, which is made from pre-stressed special glass, and an IR-permeable undercoat on the underside of the panel, which is a heat-resistant inorganic enamel paint. In order to provide a heat-resistant cook top, through which the internal parts of the cooking unit cannot be observed, without reducing the strength of the cook top, the inorganic enamel paint includes 70 to 99, preferably 80 to 95, percent by weight of inorganic pigment and from 1 to 30, preferably 5 to 20, percent by weight of glass flux. The glass flux preferably is a borosilicate glass with a thermal expansion coefficient less than or equal to $4*10^{-6}$ $K^{-1}$. The coating may be applied by screen printing techniques.

8 Claims, 1 Drawing Sheet

FOREIGN PATENT DOCUMENTS

| | | |
|---|---|---|
| EP | 0 647 885 A1 | 4/1995 |
| EP | 0 746 179 A2 | 12/1996 |
| FR | 2 736 348 | 1/1997 |
| JP | H7-17409 | 3/1991 |
| JP | 5189517 | 7/1993 |
| JP | 10273342 | 10/1998 |

* cited by examiner

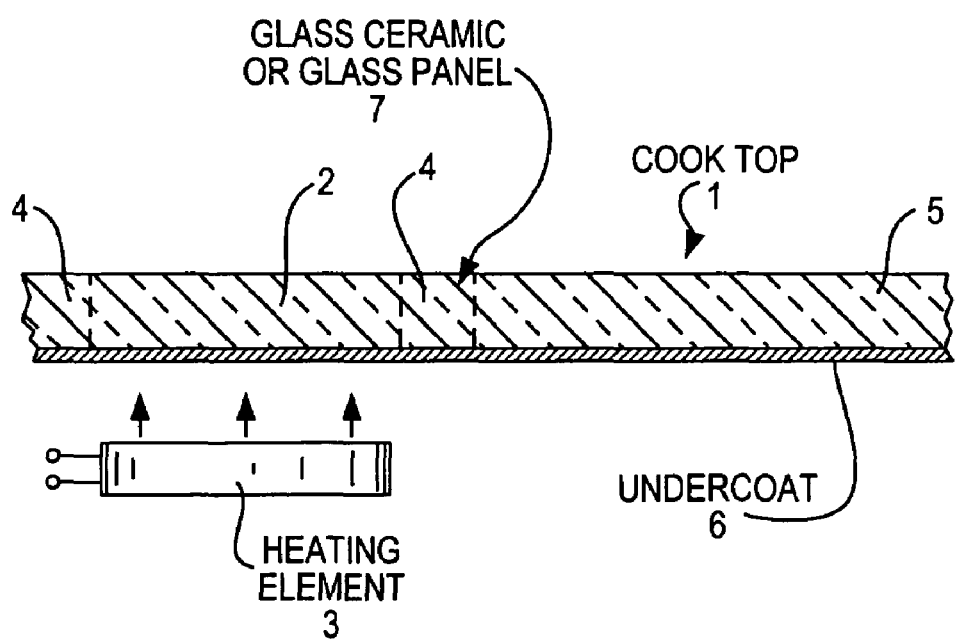

GLASS CERAMIC OR GLASS COOK TOP WITH AN IR-PERMEABLE UNDERCOAT

BACKGROUND OF THE INVENTION

1. Field of the Invention

The present invention relates to glass ceramic cook top or glass cook top comprising a glass ceramic or glass panel made of pre-stressed special glass, which provides a cooking surface, and an IR-permeable coating made of a heat-resistant inorganic enamel paint, which comprises an inorganic pigment and a glass flux, on the underside of the glass ceramic or glass panel.

2. Description of the Related Art

Cooking ranges with glass or glass ceramic panels acting as cook tops are commercially available in the art. Glass cook tops are typically transparent for visible light, however glass ceramic cook tops are usually translucent. When illuminated from above, e.g. by the cooking unit lighting, or from below, by heat radiation, the heating elements, cables and other structural components, which are hidden below the glass ceramic cooking area, can be observed and show through it. The appearance of these structural elements is considered to be troublesome for the user.

This sort of glass/glass ceramic cook top is typically, as described in EP 0 220 333, colored with color-imparting ions to reduce transmission, so that the operating components under the glass/glass ceramic cook top are not observable from above. These cook tops are thus practically non-transparent for radiation in the visible range and appear to be black.

It is also known to solve this problem by an observation-preventing coating on the underside of the transparent and/or translucent glass and/or glass ceramic cook top. Thus JPH 7-17409 and JP 51-89517 describe glass ceramic cook tops made from a transparent, colorless glass ceramic whose underside is printed with a temperature-resistant paint. This colored paint is thus formed so that the required non-transparency is provided, i.e. it replaces the otherwise conventional coloring, so that the cook top providing the cooking surface appears black when observed.

EP 0 746 179 A2 discloses the use of a covering mask for making a partially non-transparent cook top. However the application of a observation-preventing coating is costly, especially when it occurs by means of screen printing, as in the case of DE 199 06 737 A1.

The observation preventing coating usually consists of a colored lacquer, which contains organic or inorganic pigments. The lacquer adheres to the glass ceramic because of an organic additive provided in the lacquer. Thus the above-described DE 199 06 737 A1 discloses an alkyd resin lacquer for the coating. Luster-imparting paints, sol-gel coatings and noble metal paints are known as the colored lacquers for the observation-preventing coating from DE 100 14 373 A1 and DE 200 19 210 U1. However foils glued to the glass ceramic with silicone (e.g. aluminum foil) are also known. In addition, coatings, which contain no organic ingredients, are known from DE 200 19 210 U1, e.g. comprising a paint made from borosilicate glass as glass flux and titanium or cerium oxide as pigment.

Organic based paints are used almost exclusively for observation-preventing coatings of the underside of glass/glass ceramic cook tops in practice, glass ceramic cook top. The disadvantage of these organic paints is that they have only limited heat-resistance because of their organic composition. Typical ingredients, such as silicones, polyesters or resins, decompose at temperatures above 400° C. However in operation the underside of the cook top of cooking ranges reaches up to 600° C. The organic paints decompose generally under heat load and the adherence of the coating is lost over time.

Of course the paint made from borosilicate glass flux and titanium or cerium oxide as pigments disclosed in the above-described DE 200 19 210 U1 has the required temperature-resistance. However the strength of the glass ceramic cook top is clearly reduced because of differing thermal expansion coefficients and the mechanical stresses thereby produced. Furthermore the resulting coating is not observation preventing or view blocking.

SUMMARY OF THE INVENTION

It is an object of the present invention to provide a glass/glass ceramic cook top coated with an inorganic paint on its underside, as is described in the above-mentioned DE 200 19 210 U1, which is composed so that:

it forms an observation blocking or opaque coating on the glass/glass ceramic material, it is stable up to at least 600° C., and the strength of the cook top is not reduced or is only reduced to an insignificant extent.

This object and others which will be made more apparent hereinafter is attained in a cook top comprising a transparent, colorless glass ceramic or glass panel made from pre-stressed special glass, which provides a cooking surface, and an IR-permeable undercoat on its underside, which includes a heat-resistant inorganic enamel paint.

According to the invention the inorganic enamel paint contains from 70 to 99 percent by weight of the inorganic pigment and from 1 to 30 percent by weight of the glass flux.

Because the coating according to the invention is made from inorganic enamel paint it is permanently stable up to about 600° C. It is not possible however to use conventional inorganic enamel paint, since the paint either does not block observation through the cook top or the strength or durability of the glass ceramic cook top is undesirably greatly reduced. A coating with the desired properties according to the object of the invention can be obtained surprisingly by a modification of the enamel paint, when the proportion of the glass flux is reduced to only 1 to 30 percent by weight and the proportion of inorganic pigment amounts to 70 to 99 percent by weight. A view-blocking or observation-preventing coating is obtained with this composition because of the high pigment content. Because of the small portion of glass flux the strength or durability of the glass ceramic cook top is only slightly reduced.

Experiments have shown that this sort of enamel paint adheres in an outstanding manner to glass or glass ceramic despite the reduced portion of glass flux, because the reduced portion of glass flux still leads to a strong bond between the pigment and the glass and/or glass ceramic.

The strength of the glass/glass ceramic cook top is especially only slightly impaired according to the invention, when glass is used in the glass flux, which has an extremely small thermal expansion coefficient ($\alpha \leq 4*10^{-6}$ $K^{-1}$). This sort of glass can be, for example, a borosilicate glass.

Especially good values in regard to strength, viewing blocking properties and adherence are obtained when the glass flux portion is in a range of from 5 to 20 percent by weight and the pigment portion is in a range of from 80 to 95 percent by weight.

The manufacture and strength of the coating are especially good, when the underside coating is applied by screen printing. The matching ratio can be between 2 to 0.4.

So that different color effects can be obtained, the cook top is formed so that the underside coating contains a mixture of inorganic pigments.

Also the under side coating can also be a color-imparting decoration besides operating as a viewing blocking layer or barrier.

Additional features of the invention are disclosed in the dependent claims appended below.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying sole FIGURE which is a schematic sectional view through a cooking range with a cook top according to the invention, which comprises a transparent colorless glass ceramic panel providing a cooking surface and an observation-preventing coating on its underside, which comprises a heat-resistant inorganic enamel paint.

DETAILED DESCRIPTION OF THE INVENTION

The glass ceramic cook top 1 has at least one cooking zone 2 marked with the dashed vertical lines, i.e. a heated region, which is associated with an electrically operated radiant heating element 3. The heated region typically has a temperature of greater than about 350° C. It is surrounded by a ring-shaped or annular transition zone 4 marked with dashed lines with a width of 0 to 25 mm and a cool region 5, in which the temperature is usually maintained under about 220° C.

The cook top 1 comprises a transparent, colorless glass ceramic panel 7 providing the cooking surface and an undercoat 6 on its under side. The continuous, preferably full-surface, undercoat 6 is made from inorganic enamel paint according to the invention, which is applied to the underside of the transparent colorless glass ceramic panel 7.

This continuous undercoat 6 is applied during production in the simplest manner, e.g. by screen printing. However it would be sufficient in principle to coat only the heated region 2 and the transitional region 4 with the high temperature-resistant inorganic enamel paint according to the invention, and to coat the cold region 5 with different less high temperature-resistant paint, such as the paint disclosed in DE 100 14 373 A1.

In the following an example of an undercoat for the cook top is described with the inorganic enamel paint according to the invention.

A glass ceramic panel 7, e.g. CERAN® HIGHTRANS of Schott Glass, was coated on its underside with a colored paste comprising 10 parts by weight pigment powder and 20 parts by weight screen printing medium (on an acrylate base) by means of screen printing technology using a screen with a mesh size of 150μ. The pigment powder had a composition comprising 10 percent by weight glass flux and 90 percent by weight pigment, namely "SICOCER F SCHWARZ 2904", a Co/Ni/Mn/Fe/Cr spinel of BASF.

Three different glass fluxes of Schott Glas with the internal codes GF1, GF2 and BOROFLOAT® 33 were used as glass flux, whose composition is disclosed in German Patents DE 197 21 737 (GF1), DE 198 34 801 C2 (GF2) and DE 196 43 870 02 (BOROFLOAT® 33) (see the following TABLE I).

TABLE I

COMPOSITION* OF GLASS FLUX USED IN THE ENAMEL PAINTS OF THE INVENTION

| OXIDE | GF1 | GF2 | BOROFLOAT ® 33 |
|---|---|---|---|
| $Al_2O_3$ | 10–20 | 3–10 | 2.4 |
| BaO | 0–4 | 0–4 | |
| $B_2O_3$ | 15–27 | >15–23 | 12.8 |
| CaO | 0–4 | 0–4 | |
| F | 0–3, in exchange for oxygen | 0–4, in exchange for oxygen | |
| $K_2O$ | 21 2 | <2 | 0.6 |
| $Li_2O$ | 0–5 | 0–6 | |
| MgO | 0–3 | 0–4 | |
| $Na_2O$ | 0–5 | 0–5 | 3.3 |
| $SiO_2$ | 43–58 | 50–65 | 80.9 |
| $Sb_2O_3$ | 0–2 | | |
| SrO | 0–4 | 0–4 | |
| $TiO_2$ | 0–3 | 0–4 | |
| ZnO | 0–4 | <3 | |
| $ZrO_2$ | 0–4 | 0–4 | |

*amounts of ingredients in percent by weight

The glass ceramic panel coated on its underside in the above-described manner was sufficiently observation preventing or opaque after burning in the enamel paint. The bending strength was in the usual range for cook tops of at least 110 MPa (average value, determined according to DIN EN 1288-5). The heat resistance was reported to be at 670° C. in tempering experiments. The impact resistance according to DIN 60335 was greater than 0.5 Nm.

Further experiments showed that the matching ratio (by definition the ratio of pigment powder to screen printing medium) amounts to 2 to 0.4.

The bending strength was sufficiently high (greater than 110 MPa), when the glass flux proportion of the pigment powder is in a range of 5 to 20 percent by weight. The effect of the pigment on the properties of the under side coating is minimal. Nearly all inorganic pigments can be used and consequently not only a black undercoat, as is obtained with the pigment "SICOCER F SCHWARZ 2904", was used, but also undercoats of any color, such as with $TiO_2$(white), NiO, $Cr_2O_3$ (green), $Fe_2O_3$ (brown), Cr/Al-corundum (pink), Ti/Sb/Ni rutile, Zr/V-zircon (yellow) and Co/Zn/Al-spinel and/or Co/Si-olivine (blue).

The present invention can also be modified without departing from the spirit of the invention to include embodiments of the cook top, in which the IR-permeable opaque observation-blocking undercoat is multi-layered and/or is provided with a backing layer comprising another paint. In addition the undercoat on the underside may be provided with openings or different colored regions to mark cooking zones or with at least one display window for colored LEDs or LCDs, for example for at least one residual heat signaling device.

The disclosure in German Patent Application 102 43 500.6-45 of Sep. 19, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a glass ceramic or glass cook top with an IR-permeable undercoat, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A cook top comprising
   a transparent, colorless glass ceramic or glass panel providing a cooking surface, said glass ceramic or glass panel being made from pre-stressed special glass; and
   an IR-permeable undercoat on an underside of the glass ceramic or glass panel, said IR-permeable undercoat consisting of a heat-resistant inorganic enamel paint;
   wherein said inorganic enamel paint comprises from 80 to 95 percent by weight of an inorganic pigment and from 5 to 20 percent by weight of a lead-free glass flux; and
   wherein said glass flux comprises a glass with a thermal expansion coefficient less than or equal to $4*10^{-6} K^{-1}$.

2. The cook top as defined in claim 1, wherein said inorganic pigment in said undercoat comprises a mixture of different colored pigments.

3. The cook top as defined in claim 1, having a bending strength of at least 110 Mpa and an impact resistance of greater than 0.5 Nm.

4. The cook top as defined in claim 1, wherein said lead-free glass flux comprises a lead-free borosilicate glass.

5. The cook top as defined in claim 1, wherein said undercoat is applied to said underside by screen printing and burning in.

6. The cook top as defined in claim 5, wherein the inorganic enamel paint is provided for the screen printing in the form of a pigment powder and a ratio of the pigment powder to screen printing medium during the screen printing amounts to from 0.4 to 2.0.

7. The cook top as defined in claim 1, wherein said undercoat on said underside is a color-imparting decoration.

8. A cook top comprising
   a transparent, colorless glass ceramic or glass panel providing a cocking surface, said glass ceramic or glass panel being made from pre-stressed special glass; and
   an IR-permeable undercoat on an underside of the glass ceramic or glass panel, said IR-permeable undercoat consisting of a heat-resistant inorganic enamel paint; and
   wherein said inorganic enamel paint comprises from 70 to 95 percent by weight of inorganic pigment and from 5 to 30 percent by weight of lead-free glass flux;
   wherein said grass flux comprises a glass with a thermal expansion coefficient less than or equal to $4*10^{-6} K^{-1}$; and
   wherein said lead-free glass flux has a composition, in percent by weight based on oxide content, consisting of:

| | |
|---|---|
| $Al_2O_3$ | 3–20 |
| BaO | 0–4 |
| $B_2O_3$ | 15–27 |
| CaO | 0–4 |
| F | 0–3, in exchange for oxygen |
| $K_2O$ | <2 |
| $Li_2O$ | 0–6 |
| MgO | 0–4 |
| $Na_2O$ | 0–5 |
| $SiO_2$ | 43–65 |
| $Sb_2O_3$ | 0–2 |
| SrO | 0–4 |
| $TiO_2$ | 0–3 |
| ZnO | 0–4 |
| $ZrO_2$ | 0–4. |

* * * * *